United States Patent Office 2,816,888
Patented Dec. 17, 1957

2,816,888

PREPARATION OF CELLULOSE ESTERS

Bayard T. Lamborn, Matawan, N. J., assignor to Hercules Powder Company, Wilmington, Del., a corporation of Delaware No Drawing. Application March 19, 1954
Serial No. 417,506

2 Claims. (Cl. 260—230)

This invention relates to the preparation of cellulose esters and relates more particularly to the precipitation of cellulose acetate or other organic ester of cellulose from solutions of the same whereby a product of improved form is obtained.

In the preparation of cellulose acetate by a solution-type procedure; that is, where the cellulose esterifies and in turn dissolves in the reaction mix to form a so-called dope, the product is recovered from that dope by precipitation. When acetic acid alone is used as the reaction solvent, the product is generally precipitated immediately on obtaining the desired degree of hydrolysis with or without neutralizing the catalyst. When an additional solvent is incorporated, especially if it is not water-miscible, for example, methylene chloride, it has been the practice to neutralize the hydrolysis catalyst, distill the solvent, then precipitate the cellulose acetate by introducing the precipitant into an agitated vessel containing the acid dope.

In either case the precipitation step usually creates a rather large portion of finely-divided cellulose acetate which is objectionable due to yield loss and dustiness of the final dried product and the physical form of the particles varies in structure.

Therefore, a principal object of this invention is to provide a precipitation process whereby the production of finely-divided material is substantially eliminated. In addition, the precipitated product is characterized by having a uniform internal physical structure.

Another object of this invention is to provide a precipitation process whereby cellulose ester is precipitated from its reaction dope in such a manner that undesirable finely-divided material is minimized, the bulk density of the precipitated particles is increased and yet the particulated product is of such physical form that subsequent purification is readily accomplished.

Other objects of this invention will appear from the following detailed description.

Generally described, in accordance with the present invention there is provided a process for precipitating cellulose ester from its reaction solution in organic acid which comprises precipitating the ester by slow introduction of precipitant to the solution with agitation in the presence of a solvent for said ester which solvent is substantially immiscible in the dilute aqueous organic acid present in the precipitation bath thus formed, removing the solvent from the precipitation bath including the cellulose ester, and recovering the precipitated ester from said bath as a product substantially free of fines and characterized by a uniform internal physical structure.

In a more specific aspect, cellulose actate is prepared in accordance with this process wherein methylene chloride is included as the reaction solvent. After acetylation followed by hydrolysis to the desired extent is accomplished, the catalyst is neutralized, then only a portion of the methylene chloride is distilled. The retained methylene chloride is within the limits of 5 to 50% of the total weight of the dope. At this point the precipitant, either water or aqueous acetic acid up to 10% in strength, is introduced into the vessel containing the dope over an interval of about 15 minutes and with vigorous agitation. The acetate precipitates as plastic spheroids which owe their pliant nature to the solvent action of the residual methylene chloride which partitions mainly to the acetate phase. After the spheroids of desired size have formed, the agitation is slowed so that further particle size reduction is avoided; then the methylene chloride is removed from the charge by atmospheric and vacuum distillation. If a further reduction in particle size is desired, the product may be wet-ground, after completing the removal of methylene chloride, by discharging from the precipitation vessel through an apropriate mill and then washing or washing after methylene chloride removal and then grinding.

While the following examples refer to cellulose acetate specifically, other cellulose esters wherein the acyl groups comprise at least 10% acetyl may be precipitated by the process of this invention, such as cellulose acetate propionate, cellulose acetate butyrate, cellulose acetate caproate, cellulose acetate stearate, cellulose acetate sorbate or other water-insoluble ester wherein at least two of the three hydroxyl groups per anhydroglucose unit have been esterified. Moreover, in the following examples and description, the terms "reaction mixture," "reaction solution," "acetylation mixture," and "dope" have been used interchangeably. The last term is commonly used in the art and appears in the following examples which have been chosen for purposes of illustrating the invention.

*Example 1*

A 265-gram portion of cellulose acetate acid dope of the composition shown below was placed in a vessel fitted with an anchor-type agitator and two breaker-bars.

While stirring at room temperature, 260 ml. water was added slowly, causing the mass to break into small pellets of varying size. These were soft and if allowed to stand, would coalesce. The mixture was heated to 40° C. and methylene chloride was removed by passing air over the surface. After two hours the temperature was raised to 60° C. and held for ½ hour, gently agitating all the while.

The product was washed and dried, resulting in disk-like particles, the largest of which was about ⅝" in greatest diameter. The bulk density of this material was 0.43 gram per cc.

Composition of dope: Percent
Cellulose acetate (55% combined acetic acid)__ 25
Acetic acid_____ 40
Water _____ 26
Methylene chloride_____ 9

*Example 2*

In 300 grams of cellulose acetate acid dope was introduced 15 grams methylene chloride and the mass heated to 45° C. in a suitably agitated vessel.

To this mix 300 ml. water was added slowly with fairly vigorous agitation. The acetate precipitated as very small pellets, rather uniform in size when about a third of the water had been added; the remainder of the water hardened the particles without physical change and these pellets were rather firm before removing the methylene chloride.

Composition of dope: Percent
Cellulose acetate (53% combined acetic acid)___ 28
Acetic acid_____ 50
Water _____ 22

*Example 3*

To 300 grams of cellulose acid dope was added 30 grams methylene chloride and heated to 45° C. in an agitated vessel. While agitating fairly vigorously, 300 ml. water was run in slowly. When about half the water had been introduced, the mass separated into two phases. The remainder of the water caused the acetate phase to break into pellets which were quite soft and plastic but hardened on boiling off the methylene chloride.

Composition of dope:                                        Percent
  Cellulose acetate (53% combined acetic acid) ___  28
  Acetic acid _____  50
  Water _____  22

Example 4

To 100 grams cellulose triacetate acid dope was added 42 grams methylene chloride in a suitably agitated vessel and the whole heated to 45° C. One hundred ml. water was added slowly with agitation. The triacetate precipitated in the form of plastic disks of varying size which hardened with retention of form when the methylene chloride was boiled out.

Composition of dope:                                        Percent
  Cellulose acetate (61% combined acetic acid) ___  26
  Acetic acid _____  66
  Water _____   8

Example 5

Similar to Example 4 except 66 grams methylene chloride was used. The particles had about the same appearance as those from Example 4.

Example 6

Similar to Example 4 except 25 grams methylene chloride was incorporated. The particles had about the same appearance as those from Example 4 but were much smaller.

Example 7

To 315 grams acid dope containing about 28% cellulose acetate of about 53% combined acetic acid and heated to 40° C. was added 31.5 grams ethyl acetate and stirred to solution. With continued agitation 300 ml. water was slowly added.

After 50 ml. water—large, gummy particles formed
After 100 ml. water—small, soft cohesive particles
After 200 ml. water—small particles with no tendency to coalesce
After 300 ml. water—small particles became firm Most of the ethyl acetate was then evaporated by heating the mix at 80° C. Only about 2% of the precipitate was finer than 65 mesh and was quite satisfactory.

With reference to the above examples all products produced were very uniform in respect to internal physical structure and possessed a dense structure even though the pellets were of varying size.

In accordance with a preferred embodiment of the invention, cellulose is acetylated in a mix which includes the cellulose, acetic acid, acetic anhydride, methylene chloride and a catalyst where these ingredients are in a ratio of 1:0.5:2.5:4::01, respectively. Hydrolysis is accomplished by heating with 1 part water and .06 part catalyst added. At the desired acetyl content the total catalyst is neutralized and then a portion of the methylene chloride is removed by distillation. When the cellulose acetate contains from 52 to 56% combined acetic, it is preferred to retain about 10% of the total dope weight of methylene chloride. At a combined acetic acid content of 60–62.5% about 25 to 30% of the total dope weight of methylene chloride is preferred. During the distillation of the excess methylene chloride the dope temperature rises to 55–70° C., depending on the quantity removed and, in practice, precipitation is performed at the elevated temperature. This is accomplished by adding 5 parts water at the rate of ⅓ part per minute. The cellulose acetate precipitates in the form of small disks and spheroids of varying size, having no tendency to coalesce. The slurry is then heated under both atmospheric and vacuum distillation conditions to remove the residual methylene chloride. After removing the aqueous spent acetic acid, the acetate is passed through a mill to reduce any over-sized particles. Subsequent purification of the acetate may be carried out using procedures well known in the art.

While the quantity of retained methylene chloride as set forth above is preferred, as low as 5% may be retained for the precipitation of 52% combined acetic acid acetate and as low as 20% for the precipitation of substantially triacetate. The triester requires the greatest quantity of retained methylene chloride; the lower the acetyl value of the acetate the less is the quantity of methylene chloride required for precipitation in this invention. Only the minimum ratio of retained methylene chloride is critical; excess in no way changes the manner of precipitation or form of the precipitate, except perhaps to give a somewhat greater density.

Although it is not intended that the invention shall be limited to any particular theory of operation, it appears that upon completion of acetylation and hydrolysis the cellulose ester is uniformly dissolved in the reaction dope. By having a substance present which is a solvent for the derivative but substantially immiscible with the spent acid resulting from the addition of a precipitant, the mass separates into two phases for at least a portion of the time during the course of precipitation. One phase consists of diluted aqueous acid, salts and low D. P. cellulosics; the other phase comprises the cellulose derivative, acid and the solvent. At this point the pellets are quite soft. Further addition of precipitant causes more of the acid to leave the cellulose ester phase causing an increase in concentration of the latter and the pellets become tougher. This concentration of the cellulose derivative by (a) phase separation and (b) extraction of acid causes the product to increase in bulk density. By remaining plastic or gummy during most of the precipitation a semipermeable membrane is not formed on the particulated ester, hence cellulosics of low D. P. are extracted by the aqueous phase. Because the cellulose ester is not "shocked" out of solution by the precipitant, the product has a relatively uniform distribution of solvent when final precipitation occurs through removal of that residual solvent. This imparts uniformity to the particle structure.

The precipitant which may be be used in accordance with this invention includes water and dilute aqueous organic acid in the case where cellulose acetate is to be precipitated. The solvent includes any substance which is a solvent for the cellulose ester but which is immiscible or only partly soluble in the resulting diluted acid upon adding the precipitant. Examples of such solvents are methylene chloride, ethyl acetate, methyl acetate, propyl acetate, butyl acetate, chloroform, dimethyl phthalate, diethyl phthalate, tricresyl phosphate and triphenyl phosphate. The preferred method of removing the solvent is by distillation, however, in cases where the boiling point of the solvent selected is such that removal by distillation is not feasible, an extraction agent may be used.

It will be seen, therefore, that this invention may be carried out by the use of various modifications and changes without departing from its spirit and scope.

The advantages of this invention are multifold and are set forth as follows more particularly in respect to observations made on cellulose acetate which is a preferred material for practicing the invention:

The apparent bulk density is increased to a level of .4 to .5 gram per cc. from the normal range of .25–.35 gram per cc. when the acetate has a combined acetic acid value of 53 to 55%. In the triacetate range the bulking is increased from about .5 gram per cc. to about .6 per cc. This allows greater storage without increasing facilities.

Because the acetate pellets which form in the initial stage of precipitation are plastic, due to retained methylene chloride, the short chain length (low D. P.) fractions are extracted and remain dissolved in the weak acid (25 to 35% acetic). These dissolved cellulosic esters have intrinsic viscosities of 0.18 and lower as determined in 80:20 acetone, water by volume, and represent as much as .5 to .8% of the total acetate at the 53% combined acetic acid level; and as much as .01 to .05% at the 62.5 to 60% combined acetic acid level. The removal of the low D. P. fractions which are water-sensitive contributes toward less delustering of textiles made from the acetate.

Unlike the particulated material resulting from usual precipitation wherein a fibrous structure of varying degrees of porosity results, the precipitate by this invention has a very uniform and rather dense structure even though the pellets are of varying size. Because of this nature the pellets as such or when further reduced in size by grinding absorb solvent or plasticizer uniformly so that a much more even distribution results and the tendency toward "balling-up" or agglomerating during mixing is markedly lessened. In addition, the dry acetate exhibits much less dustiness.

When acetate is precipitated by this procedure, only about 3 to 5% of the particles is smaller than 65 mesh in contrast to 10–15% when precipitation is accomplished by prior art methods where the precipitant is added to the dope.

What I claim and desire to protect by Letters Patent is:

1. In a process for precipitating cellulose acetate which has been prepared by acetylating cellulose with a mixture of acetic anhydride, acetic acid, methylene chloride and acetylation catalyst, after which said catalyst has been neutralized and said cellulose acetate is in solution in a solvent comprising essentially acetic acid and methylene chloride, said methylene chloride being present in an amount substantially greater than 30% by weight of said solution, the improvement which comprises removing methylene chloride from the cellulose acetate solution by distillation to obtain a residual amount of methylene chloride in said solution of between 5% and 30% by weight, slowly introducing an aqueous precipitant over a period of about 15 minutes to the resulting cellulose acetate solution in said acetic acid and said residual methylene chloride with agitation until an aqueous precipitation bath comprising between about 20% and about 40% by weight of acetic acid is formed and the cellulose acetate precipitates from the precipitation bath thus formed substantially all in the form of small disks and spheroids having substantially no tendency to coalesce, thereafter removing the residual methylene chloride from the precipitation bath by further distillation, and recovering the precipitated cellulose acetate from the precipitation bath as a product substantially free of fines, having a bulk density between about 0.4 and 0.6 gram per cc. and characterized by a uniform internal physical structure, at least 95% of said product being retained on a 65-mesh screen.

2. In a process for precipitating secondary cellulose acetate which has been prepared by acetylating cellulose with a mixture of acetic anhydride, acetic acid, methylene chloride and acetylation catalyst, after which the primary cellulose acetate thus formed has been hydrolyzed to the desired acetyl content and said catalyst has been neutralized, and the resulting secondary cellulose acetate is in solution in a solvent comprising essentially acetic acid and methylene chloride, said methylene chloride being present in an amount substantially greater than 30% by weight of said solution, the improvement comprising removing methylene chloride from the secondary cellulose acetate solution by distillation to obtain a residual amount of methylene chloride in said solution of between 5% and 30% by weight, slowly introducing an aqueous precipitant over a period of about 15 minutes to the resulting secondary cellulose acetate solution in said acetic acid and said residual methylene chloride with agitation until an aqueous precipitation bath comprising between about 20% and about 40% by weight of acetic acid is formed and the secondary cellulose acetate precipitates from the precipitation bath thus formed substantially all in the form of small disks and spheroids having substantially no tendency to coalesce, thereafter removing the residual methylene chloride from the precipitation bath by further distillation, and recovering the precipitated secondary cellulose acetate from the precipitation bath as a product substantially free of fines, having a bulk density between about 0.4 and 0.6 gram per cc. and characterized by a uniform internal physical structure, at least 95% of said product being retained on a 65-mesh screen.

References Cited in the file of this patent

UNITED STATES PATENTS

| | | |
|---|---|---|
| 2,126,190 | Hofmann | Aug. 9, 1938 |
| 2,239,782 | Haney | Apr. 29, 1941 |
| 2,543,191 | Neilson | Feb. 27, 1951 |
| 2,588,051 | Sharman et al. | Mar. 4, 1952 |
| 2,596,656 | Crane | May 13, 1952 |
| 2,652,340 | Hiatt et al. | Sept. 15, 1953 |
| 2,722,528 | Johnson | Nov. 1, 1955 |
| 2,740,723 | Voris | Apr. 3, 1956 |
| 2,775,585 | Bates et al. | Dec. 25, 1956 |